May 9, 1961
V. L. PEICKII ET AL
2,983,125
FLUID SEALS
Filed Nov. 16, 1959
FIG. 1
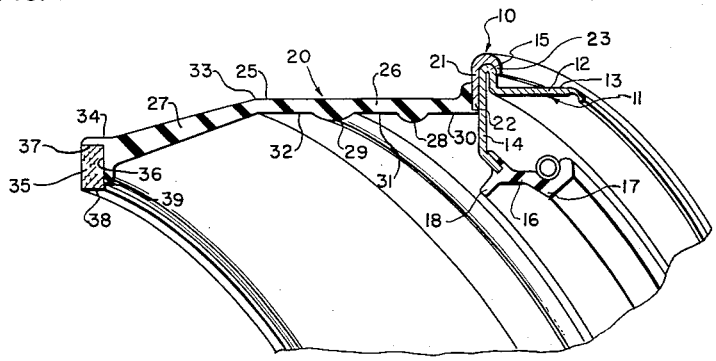
FIG. 2
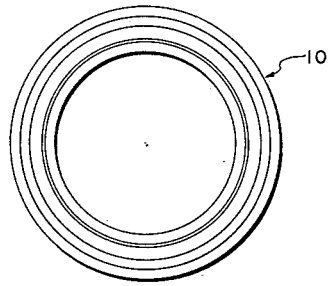
FIG. 3
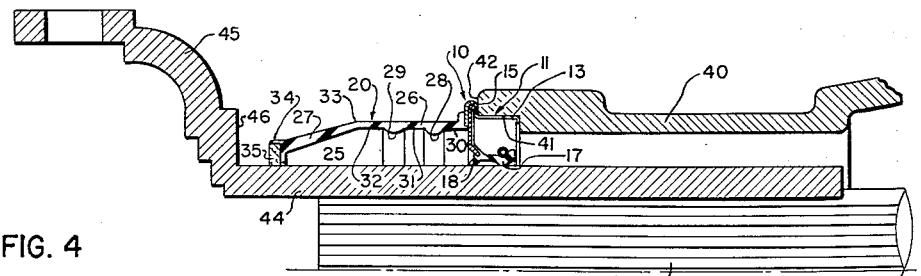
FIG. 4
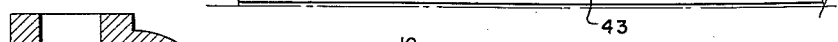
FIG. 5

United States Patent Office 2,983,125
Patented May 9, 1961

2,983,125
FLUID SEALS

Vasalie L. Peickii, Hillsborough, and Arthur M. Scott, Redwood City, Calif., assignors to Federal-Mogul-Bower Bearings, Inc., Detroit, Mich., a corporation of Michigan Filed Nov. 16, 1959, Ser. No. 853,047

11 Claims. (Cl. 64—32)

This invention relates to an improved fluid seal of the type adapted to seal between a stationary bore and a rotating shaft, and relates particularly to environments where the shaft is subject to relatively large reciprocatory action.

A very important application of this invention is in the rear transmission of automotive vehicles. The fluid seal at the rear transmission is subject to wear resulting from reciprocation of the drive shaft, which is caused by the chucking action of the rear wheels of the vehicle. As the shaft moves in and out, it is exposed to moisture, dirt, oil, etc., and then when it moves back and forth through the seal it carries abrasive particles with it. Also, the shaft tends to corrode, and any seal operating on a corroded shaft wears out in short order.

The present invention has solved this problem by providing, in addition to the radial shaft seal, an elongated boot-like sleeve supported by the seal assembly and enclosing a substantial portion of the shaft. The sleeve is collapsible so that when the universal joint moves against it, the sleeve folds and rolls over itself. At the outer end of the sleeve is a stiff ring which, though not intended to seal against the shaft, fits closely about it without interfering with its rotative or reciprocatory movement. This stiff ring aids in obtaining the proper collapse of the sleeve, serves to enable relative rotation of the universal joint at low torque and low friction, and also serves as a deterrent against dust getting inside the sleeve. Thus, the shaft is not exposed to the corrosive and abrasive elements and cannot be exposed to them so long as the sleeve is longer than the reciprocatory action of the shaft.

The seal of this invention is an integral assembly and is sold as such, with the advantages of unitary installation, certain protection, accurate relative positioning, assurance of a seal between the sleeve and the shaft seal, and close cooperation between the two. While the rear transmission has been used as an exemplary environment for this seal, it should be pointed out that the invention is not limited to this particular application but may be used wherever a problem of this nature exists.

Other objects and advantages of the invention will appear from the following description of a preferred embodiment.

In the drawings:

Fig. 1 is an enlarged fragmentary view in perspective and in section of a portion of a fluid seal assembly embodying the principles of the invention.

Fig. 2 is a reduced view in end elevation of the seal of Fig. 1.

Fig. 3 is a view in elevation and in section on a scale intermediate those of Figs. 1 and 2 of a portion of an installation incorporating the seal, the seal sleeve being shown in its extended position.

Fig. 4 is a view like Fig. 3 showing the seal sleeve partially collapsed.

Fig. 5 is a view like Fig. 3 showing the seal sleeve fully collapsed.

As shown in the drawings, the seal 10 includes a suitable fluid sealing assembly 11 having a case 12 with a cylindrical portion 13 adapted to fit into the bore of a housing in leak-tight engagement with it, and a radial flange 14. The radial flange 14 meets the cylindrical portion 13 at a shotgun-like radially outwardly extending rim 15. At the opposite end of the radial flange 14 is a sealing element 16 which, in this instance, is shown as constructed in patent application S.N. 639,276, filed Feb. 11, 1957, by Robert N. Haynie. The particular seal shown is a preferred one, although other types of seals may be used, including leather seals. In the seal shown there is a lubricant sealing lip 17 and a dirt and dust excluding lip 18.

In addition to the seal assembly 11, the invention includes a shaft-enclosing and protecting sleeve assembly 20. The assembly 20 includes a metal ring 21 which acts as a supporting and anchoring element. The ring 21 has a radial portion 22 adapted to overlap the radial flange 14, and is formed with a hook-like catch 23 which overlies the rim 15 and thereby is clamped securely to the seal assembly 11.

Bonded to the radial portion 22 of the ring 21 is an elastomeric sleeve 25 of extended length having a cylindrical portion 26 and an inwardly tapered frusto-conical portion 27. The cylindrical portion 26 preferably is provided with a pair of circular ribs 28 and 29 defining flexing sections 30, 31, and 32. The tapered portion 27 is preferably constructed so that its thickness gradually increases between its junction 33 with the cylindrical portion 25 and a reduced diameter end portion 34.

At the end portion 34 a ring 35, preferably of phenolic resin or some other suitable stiff material is provided. The ring 35 is bonded to the end portion 34 at a radial seat 36 and a cylindrical wall 37, and its inner pierce 38 lies radially inside the inner periphery 39 of the portion 33. The inner pierce 38 is made free from flash by first bonding the ring 35 to the end portion 33 and then machining out, or punching out, the center pierce 38 so as to form a smooth inner periphery. This elimination of flash also eliminates squeal, which tends to occur during the first few minutes of operation when flash is present.

Fig. 3 shows installation of the seal embodying this invention in a rear end transmission. A housing 40 is shown with a bore 41, and the cylindrical portion 13 of the seal 11 is inserted into the bore 41 with the rim 15 engaging a wall 42 to prevent over-insertion and to define accurately the position of the seal. A shaft 43 rotates relative to the housing 40 and is splined to a sleeve 44 of a universal joint member 45. The dust sealing and lubricant sealing lips 17 and 18 ride on the sleeve 44, while the resin ring 35 barely touches the sleeve 44.

When the transmission housing 40 is moved closer to the universal joint 45, the wall 46 of the universal joint engages the ring 35 and pushes it toward the housing 40 (Figs. 4 and 5). Since the portion 27 is thicker than the portion 26, movement of the ring 35 forces the portion 32 to flex, as shown in Fig. 4, and the portion 27 begins to ride out over and around the portion 26. The portions 30 and 31 also flex as shown, due to this movement. Further movement results (Fig. 5) in the flexing of the portion 31 until the portion 29 is around and almost against the portion 28, while the portion 33 moves in almost to the wall 42. The structure, with the ribs 28 and 29, the flexing portions 30, 31 and 32, the vertex 33, and the thickening of the portion 27, provides for regular and repetitive flexing along the same lines each time, the cylindrical portion 26 becoming slightly concave after a little use.

It will be appreciated that when the sleeve 25 is flexed it still excludes dust, dirt, moisture, and other foreign matter from the sleeve 44, and its abutment with the wall 46 prevents access of these agents to the sleeve 44. Thus, when the rear wheels hit rough spots in the road the movement of the drive shaft 42 and sleeve 44 does not impair their cleanliness; therefore, the life of the sealing element 16 is considerably extended over the life of sealing elements known in the art before the present invention.

To those skilled in the art to which this invention relates, many additional changes in construction and widely differing embodiments of the invention will suggest themselves without departing from the spirit and scope of the invention as defined in the claims.

What is claimed is:

1. A device for sealing against the passage of fluid between a housing and a rotating shaft that projects beyond the housing and is also subject to reciprocating action, comprising a radial shaft seal having an annular case with a portion that engages said housing in a leak-tight fit and a sealing member supported by said case in rotary sealing contact with said shaft; and a shaft-encircling sleeve secured to said case and having an elongated axial collapsible portion extending out therefrom away from and beyond said housing and having, at a point remote from said case, a ring of material softer than said shaft and in light reciprocating and rotary contact therewith.

2. A device for sealing against the passage of fluid between a bore wall and a rotating shaft that is also subject to reciprocating action, comprising a radial shaft seal having an annular case with a cylindrical portion that seals stationarily in the bore wall and a radially inwardly extending portion and a sealing member supported by said case in rotary contact with said shaft; and a shaft-encircling sleeve secured to said case and having an elongated axial elastomeric collapsible portion extending out therefrom away from and beyond said sealing member and having, at a point remote from said case, a rigid ring of material softer than said shaft and in light reciprocating and rotary contact therewith, said elongated portion being longer than the amount of reciprocation of said shaft, so that the portions of said shaft able to contact said sealing member are kept clean.

3. In combination: a housing having a bore wall; a rotating shaft that is subject to a certain maximum amount of reciprocating action; a radial shaft seal having an annular case that seals against the bore wall and a sealing member supported by said case with a sharp lip in rotary sealing contact with said shaft; and a shaft-encircling sleeve secured to said case and having an elongated axially collapsible portion extending out therefrom away from and beyond said sealing member and having, at a point remote from said case, a ring of material softer than said shaft and in light reciprocating and rotary contact therewith, said elongated portion being longer than the maximum amount of reciprocation of said shaft, so that the portions of said shaft able to contact said sealing member are kept clean.

4. A device for sealing against the passage of fluid between a bore wall and a rotating shaft that is subject to reciprocating action, comprising a radial shaft seal having an annular metal case with a cylindrical bore-sealing portion and a radially inwardly extending portion and a sealing member supported by said latter portion in rotary sealing contact with said shaft; and a shaft-encircling sleeve secured to said case and having an elongated axially collapsible elastomeric member extending out therefrom away from and beyond said sealing member, said member comprising a generally cylindrical portion and a tapered portion, and, at the smaller end of said tapered portion, a rigid ring of material softer than said shaft bonded to said elastomeric member for light reciprocating and rotary contact with said shaft.

5. A fluid seal for engagement with a rotating shaft that is subject to some reciprocation, comprising: an annular metal case having a cylindrical bore-fitting portion, a radially inwardly extending flange, and a radially outwardly extending rim where said flange and said cylindrical portion meet; an elastomeric sealing member supported by said case in rotary sealing engagement with said shaft; a metal support ring clamped to said rim; an elastomeric sleeve bonded to said ring and having a generally cylindrical portion extending out from said ring away from said flange, a generally frusto-conical portion extending from said generally cylindrical portion and having a narrow diameter outer end, and a stiff end ring slightly larger in diameter than said sealing member at said outer end.

6. A rear transmission seal for engagement with the drive shaft of an automotive vehicle, comprising; an annular metal case having a cylindrical portion adapted to fit in a bore wall in leak-tight engagement therewith, a radially inwardly extending flange, and a radially outwardly extending rim where said flange and said cylindrical portion meet; an elastomeric sealing member supported by said radial flange in rotary sealing engagement with said drive shaft; a metal support ring clamped to said rim and having a radial portion on the opposite side of said flange from said cylindrical portion; an elastomeric sleeve having an end bonded to said radial portion, a generally cylindrical portion extending out from said bonded end away from said flange, a generally frusto-conical portion extending from said generally cylindrical portion and having a narrow diameter outer end, and a ring of resin slightly larger in diameter than said sealing member bonded to said outer end.

7. The seal of claim 6 wherein said sealing element has a dust-sealing lip and a lubricant sealing lip on the opposite side of said dust-sealing lip from said sleeve.

8. The seal of claim 6 wherein said sleeve cylindrical portion has a plurality of thickened circular ribs defining flexing portions between them and on each side of them.

9. The seal of claim 6 wherein said frusto-conical portion has walls whose thickness gradually increases from said generally cylindrical portion to said outer end.

10. A fluid seal for engagement with a rotating shaft that is subject to some reciprocation, comprising: an annular metal case having a cylindrical bore-fitting portion, a radially inwardly extending flange, and a radially outwardly extending rim where said flange and said cylindrical portion meet; an elastomeric sealing member supported by said case in rotary sealing engagement with said shaft; a metal support ring clamped to said rim; an elastomeric sleeve bonded to said ring and having a generally cylindrical portion extending out from said ring away from said flange and having an interior surface with two thickened annular ribs spaced from each other and from the ends of said generally cylindrical portion to define three flexing portions; a generally frusto-conical portion extending from said cylindrical portion and having a narrow-diameter outer end, the thickness of the walls of said generally frusto-conical portion being greater than that of said flexing portions; and an end ring of stiff resin slightly larger in diameter than said sealing member bonded to said outer end and having a smooth flash-free inner periphery.

11. In an automobile rear transmission, having a transmission housing with a bore wall, drive shaft, and a universal joint with a sleeve splined to said drive shaft and an enlarged portion, the combination therewith of: an annular metal case having a cylindrical portion fitted in said bore wall in leak-tight engagement therewith, a radially inwardly extending flange, and a radially outwardly extending rim where said flange and said cylindrical portion meet; an elastomeric sealing member supported by said radial flange in rotary sealing engagement with said sleeve; a metal support ring clamped to said rim and having a radial portion on the opposite side of said flange from said cylindrical portion; and an elastomeric sleeve having an end bonded to said radial portion, a generally cylindrical portion extending out from said bonded end toward said enlarged portion of the universal joint, said generally cylindrical portion having flexing portions, a thickened, generally frusto-conical portion extending from said generally cylindrical portion and having a narrow diameter outer end, one said flexing portion being at the juncture of said generally cylindrical portion and said generally frusto-conical portion, so that upon compression of said elastomeric sleeve said generally frusto-conical portion rides out around and over said generally cylindrical portion; and a ring of resin slightly larger in diameter than said sealing member bonded to said outer end.

References Cited in the file of this patent

UNITED STATES PATENTS

| | | |
|---|---|---|
| 2,308,073 | Hagerty | Jan. 12, 1943 |
| 2,432,803 | Rice | Dec. 16, 1947 |
| 2,702,996 | Davis | Mar. 1, 1955 |
| 2,761,295 | Davis | Sept. 4, 1956 |